(12) United States Patent
Griffin et al.

(10) Patent No.: US 7,076,655 B2
(45) Date of Patent: Jul. 11, 2006

(54) MULTIPLE TRUSTED COMPUTING ENVIRONMENTS WITH VERIFIABLE ENVIRONMENT IDENTITIES

(75) Inventors: Jonathan Griffin, Bristol (GB); Liqun Chen, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 938 days.

(21) Appl. No.: 10/175,183

(22) Filed: Jun. 18, 2002

(65) Prior Publication Data

US 2002/0194482 A1 Dec. 19, 2002

(30) Foreign Application Priority Data

Jun. 19, 2001 (GB) .................................. 0114895.6

(51) Int. Cl.
*H04L 9/00* (2006.01)
*G06F 12/14* (2006.01)
*G08B 29/00* (2006.01)

(52) U.S. Cl. ..................... 713/164; 726/17; 726/21; 726/30

(58) Field of Classification Search ................ 713/164, 713/165, 166, 167
See application file for complete search history.

(56) References Cited

U.S. PATENT DOCUMENTS

| | | | |
|---|---|---|---|
| 4,799,156 A | 1/1989 | Shavit et al. | 705/26 |
| 4,926,476 A | 5/1990 | Covey | 713/164 |
| 5,029,206 A | 7/1991 | Marino et al. | 713/164 |
| 5,032,979 A | 7/1991 | Hecht et al. | 364/200 |
| 5,038,281 A | 8/1991 | Peters | 364/200 |
| 5,144,660 A | 9/1992 | Rose | 380/4 |
| 5,359,659 A | 10/1994 | Rosenthal | 380/4 |
| 5,361,359 A | 11/1994 | Tajalli et al. | 395/700 |
| 5,404,532 A | 4/1995 | Allen et al. | 395/700 |
| 5,421,006 A | 5/1995 | Jablon et al. | 395/575 |
| 5,440,723 A | 8/1995 | Arnold et al. | 395/181 |
| 5,444,850 A | 8/1995 | Chang | 395/200.1 |
| 5,473,692 A | 12/1995 | Davis | 380/25 |
| 5,504,814 A | 4/1996 | Miyahara | 713/164 |
| 5,530,758 A | 6/1996 | Marino et al. | 713/150 |
| 5,572,590 A | 11/1996 | Chess | 380/4 |
| 5,619,571 A | 4/1997 | Sandstrom | 380/4 |
| 5,680,547 A | 10/1997 | Chang | 395/200.01 |
| 5,692,124 A | 11/1997 | Holden et al. | 726/2 |
| 5,694,590 A | 12/1997 | Thuraisingham et al. | 395/600 |

(Continued)

FOREIGN PATENT DOCUMENTS

CA    2 187 855 A    6/1997

(Continued)

OTHER PUBLICATIONS

Schell et al.,"Platform Security: What is Lacking", 2000, Elsevier Sci Ltd, vol. 5, No. 1. pp. 26-41.*

(Continued)

*Primary Examiner*—Matthew Smithers

(57) ABSTRACT

A host computing platform 20 provides one or more computing environments 24 and includes a trusted device 213 arranged to form an integrity metric individual to each computing environment 24. The integrity metric is provided to a user 10 in response to an integrity challenge, signed for authentication using a signature key 213 held by the trusted device. In one embodiment the trusted device 213 selects a signature key unique to the computing environment 24, or in a second embodiment the trusted device forms the signed integrity metric including an identity label, in each case such that the user 10 can verify that the signed integrity metric corresponds to the expected computing environment 24.

52 Claims, 7 Drawing Sheets

U.S. PATENT DOCUMENTS

| | | | |
|---|---|---|---|
| 5,787,175 A | 7/1998 | Carter | 713/165 |
| 5,809,145 A | 9/1998 | Slik | 380/25 |
| 5,815,665 A | 9/1998 | Teper et al. | 395/200.59 |
| 5,841,869 A | 11/1998 | Merkling et al. | 713/164 |
| 5,844,986 A | 12/1998 | Davis | 380/4 |
| 5,845,068 A | 12/1998 | Winiger | 726/3 |
| 5,867,646 A | 2/1999 | Benson et al. | 395/186 |
| 5,903,732 A | 5/1999 | Reed et al. | 395/200.59 |
| 5,922,074 A | 7/1999 | Richard et al. | 726/21 |
| 5,933,498 A | 8/1999 | Schneck et al. | 705/504 |
| 5,960,177 A | 9/1999 | Tanno | 395/200.59 |
| 5,987,608 A | 11/1999 | Roskind | 713/200 |
| 6,006,332 A | 12/1999 | Rabne et al. | 713/201 |
| 6,012,080 A | 1/2000 | Ozden et al. | 718/102 |
| 6,023,765 A | 2/2000 | Kuhn | 713/200 |
| 6,067,559 A | 5/2000 | Allard et al. | 709/202 |
| 6,078,948 A | 6/2000 | Podgorny et al. | 709/204 |
| 6,081,830 A | 6/2000 | Schindler | 709/204 |
| 6,081,894 A | 6/2000 | Mann | 713/188 |
| 6,125,114 A | 9/2000 | Blanc et al. | 370/389 |
| 6,138,239 A | 10/2000 | Veil | 713/200 |
| 6,272,631 B1 | 8/2001 | Thomlinson et al. | 713/155 |
| 6,275,848 B1 | 8/2001 | Arnold | 709/206 |
| 6,289,462 B1 | 9/2001 | McNabb et al. | 713/201 |
| 6,292,900 B1 | 9/2001 | Ngo et al. | 713/200 |
| 6,327,652 B1 | 12/2001 | England et al. | 713/2 |
| 6,330,670 B1 | 12/2001 | England et al. | 713/2 |
| 6,334,118 B1 | 12/2001 | Benson | 713/167 |
| 6,367,012 B1 | 4/2002 | Atkinson et al. | 713/176 |
| 6,393,412 B1 | 5/2002 | Deep | 705/400 |
| 6,477,702 B1 | 11/2002 | Yellin et al. | 717/126 |
| 6,505,300 B1 | 1/2003 | Chan et al. | 713/164 |
| 6,513,156 B1 | 1/2003 | Bak et al. | 717/151 |
| 6,609,248 B1 | 8/2003 | Srivastava et al. | 717/147 |
| 6,671,716 B1 | 12/2003 | Didrechsen et al. | 709/203 |
| 6,681,304 B1 | 1/2004 | Vogt et al. | 711/164 |
| 6,707,440 B1 | 3/2004 | Kim et al. | 726/24 |
| 6,732,276 B1 | 5/2004 | Cofler et al. | 713/200 |
| 6,751,680 B1 | 6/2004 | Langerman et al. | 710/3 |
| 6,757,824 B1 | 6/2004 | England | 713/156 |
| 6,757,830 B1 | 6/2004 | Tarbotton et al. | 713/188 |
| 6,775,779 B1 | 8/2004 | England et al. | 713/200 |
| 6,892,307 B1 | 5/2005 | Wood et al. | 726/8 |
| 6,931,545 B1 | 8/2005 | Ta et al. | 713/156 |
| 6,965,816 B1 | 11/2005 | Walker | 701/16 |
| 2001/0037450 A1 | 11/2001 | Metlitski et al. | 713/152 |
| 2002/0012432 A1 | 1/2002 | England et al. | 380/231 |
| 2002/0023212 A1 | 2/2002 | Proudler | 713/164 |
| 2002/0069354 A1 | 6/2002 | Fallon et al. | 713/2 |
| 2002/0184486 A1 | 12/2002 | Kerschenbaum et al. | 713/150 |
| 2002/0184520 A1 | 12/2002 | Bush et al. | 713/200 |
| 2003/0191957 A1 | 10/2003 | Hypponen et al. | 713/200 |
| 2003/0196110 A1 | 10/2003 | Lampson et al. | 713/200 |
| 2004/0045019 A1 | 3/2004 | Bracha et al. | 719/332 |
| 2004/0073617 A1 | 4/2004 | Milliken et al. | 709/206 |
| 2004/0148514 A1 | 7/2004 | Fee et al. | 713/200 |
| 2005/0256799 A1 | 11/2005 | Warsaw et al. | 705/37 |

FOREIGN PATENT DOCUMENTS

| | | |
|---|---|---|
| EP | 0 304 033 A | 2/1989 |
| EP | 0 421 409 A2 | 4/1991 |
| EP | 0 510 244 A1 | 10/1992 |
| EP | 0 580 350 A1 | 1/1994 |
| EP | 0 825 511 A | 2/1998 |
| EP | 0 849 657 A | 6/1998 |
| EP | 0 849 680 A2 | 6/1998 |
| EP | 0 465 016 | 12/1998 |
| EP | 0 893 751 A1 | 1/1999 |
| EP | 0 895 148 A | 2/1999 |
| EP | 0 926 605 A1 | 6/1999 |
| EP | 0 992 958 A2 | 4/2000 |
| EP | 1 056 014 A | 8/2000 |
| EP | 1030237 | 8/2000 |
| EP | 1 049 036 A2 | 11/2000 |
| EP | 1 055 990 A1 | 11/2000 |
| EP | 1 056 010 A1 | 11/2000 |
| EP | 1 076 279 A1 | 2/2001 |
| EP | 1 107 137 A2 | 6/2001 |
| GB | 2 317 476 A | 3/1998 |
| GB | 2 336 918 A | 11/1999 |
| GB | 0020441.2 | 8/2000 |
| GB | 2 353 885 A1 | 3/2001 |
| GB | 2 361 153 A | 10/2001 |
| WO | 93/25024 A | 12/1993 |
| WO | 94/11967 A1 | 5/1994 |
| WO | 95/24696 A | 9/1995 |
| WO | 95/27249 A | 10/1995 |
| WO | 97/29416 | 8/1997 |
| WO | 98/15082 A | 4/1998 |
| WO | 98/26529 | 6/1998 |
| WO | 00/19324 A1 | 8/1998 |
| WO | 98/36517 A | 8/1998 |
| WO | 98/40809 A2 | 9/1998 |
| WO | 98/44402 | 10/1998 |
| WO | 98/45778 A | 10/1998 |
| WO | 00/19324 A1 | 4/2000 |
| WO | 00/31644 | 6/2000 |
| WO | 00/48062 | 8/2000 |
| WO | 00/48063 | 8/2000 |
| WO | 00/52900 A1 | 9/2000 |
| WO | 00/54125 | 9/2000 |
| WO | 00/54126 | 9/2000 |
| WO | 00/58859 | 10/2000 |
| WO | 00/73880 | 12/2000 |
| WO | 00/73904 | 12/2000 |
| WO | 00/73913 A1 | 12/2000 |
| WO | 01/09781 A2 | 2/2001 |
| WO | 01/13198 | 2/2001 |
| WO | 01/23980 A1 | 4/2001 |
| WO | 01/27722 A1 | 4/2001 |
| WO | 01/65334 A2 | 9/2001 |
| WO | 01/65366 A1 | 9/2001 |

OTHER PUBLICATIONS

Safford, D., "The need for TCPA", Oct. 2002, IBM Research, pp. 1-7.*

Microsoft, "Building a Secure Platform for Trustworthy Computing", Aug. 2002, pp. 1-10.*

Trusted Computing Platform Alliance, Main Specification Version 1.0, 284 pages (Jan. 25, 2001).

Anderson, R., et al., "Tamper Resistance—a Cautionary Note," *ISENIX Association, Second USENIX Workshop on Electronic Commerce*, pp. 1-11 (Nov. 18-21, 1996).

Berger, J.L., et al., "Compartmented Mode Workstation: Prototype Highlights," *IEEE Transactions on Software Engineering*, vol. 16, No. 6 (Jun. 1990).

Chaum, D., "Security without Identification: Transaction Systems to Make Big Brother Obsolete," *Communications of the ACM*, vol. 28, No. 10, pp. 1030-1044 (Oct. 1985).

Choo, T.H., et al., "Trusted Linux: A Secure Platform for Hosting Compartmented Applications," *Enterprise Solutions*, pp. 1-14 (Nov./Dec. 2001).

Dalton, C., et al., "An operating system approach to securing e-services," *Communications of the ACM*, vol. 44, Issue 2 (Feb. 2001).

Dalton, C., et al., "Applying Military Grade Security to the Internet," *Computer Networks and ISND Systems*, vol. 29, pp. 1799-1808 (1997).

Dalton, C.I., et al., "Design of secure UNIX," Elsevier Information Security Report, (Feb. 1992).

Hallyn, S.E., et al., "Domain and Type Enforcement for Linux," Internet: <http://www.usenix.org/publications/library/proceedings/als2000/full_papers/hallyn/hallyn_html/>. (Retrieved Apr. 24, 2002).

Loscocco, P., et al., "Integrating Flexible Support for Security Policies into the Linux Operating System," Internet: <www.nsa.gov/selinux> (Retrieved Apr. 24, 2002).

Milojicic, D., et al., "Process Migration," Internet: <http://www.hpl.hp.com/techreports/1999/HPL-1999-21.html.> pp. 1-48 (Dec. 5, 1998).

Scheibe, M., "TCPA Security: Trust your Platform!" *Quarterly Focus PC Security*, pp. 44-47. Internet: <http://www.silicon-trust.com/pdf/secure_PDF/Seite_44-47.pdf>.

Senie, D., "Using the SOCK_PACKET mechanism in Linux to gain complete control of an Ethernet Interface," Internet: <http://www.senie.com/dan/technology/sock_packet.html>. (Retrieved Apr. 24, 2002).

Wiseman, S., et al., "The Trusted Path between SMITE and the User," *Proceedings 1988 IEEE Symposium on Security and Privacy*, pp. 147-155 (Apr. 18-21, 1988).

Yee, B., "Using Secure Coprocessors," Doctoral thesis—Carnegie Mellon University, pp. 1-94 (May 1994).

*Boot Integrity Services Application Programming Interface*, Version 1.0, Intel Corporation, pp. 1-60 (Dec. 28, 1998).

"Building a Foundation of Trust in the PC," *Trusted Computing Platform Alliance*, pp. 1-7 (Jan. 2000).

"HP Virtualvault: Trusted Web-server Platform Product Brief," Internet: <http://www.hp.com/security/products/virtualvault/papers/brief_4.0/> pp. 1-6.

"Information technology—Security techniques—Entity authentication; Part 3: Mechanisms using digital signature techniques," *ISO/IEC 9798-3*, Second Edition, pp. 1-6 (1998).

"Information technology—Security techniques—Key management—Part 3: Mechanisms using asymmetric techniques," *ISO/IEC 11770-3*, pp. 1-34 (1999).

"NIST Announces Technical Correction to Secure Hash Standard," Internet: <http://www.nist.gov/public_affairs/releases/hashstan.htm> pp. 1-2 (Oct. 24, 2002).

"Norton Antivirus 5.0 Delux," *PC Magazine Online; The 1999 Utility Guide: Desktop Antivirus*, pp. 1-2, Internet: <http://wwww.zdnet.com/pcmag/features/utilities99/deskav07.html> (Retrieved Nov. 30, 2001).

"Secure Computing with JAVA™: Now and the Future," Internet: <http://java.sun.com/marketing/collateral/security.html> pp. 1-29 (Apr. 2, 2002).

"Secure Execution Environments, Internet Safety through Type-Enforcing Firewalls," Internet: <thp://www.ghp.com/research/nailabs/secure-execution/internet-safety.asp> (Retrieved Apr. 24, 2002).

*Sophos Anti-Virus for Notes/Domino Release Notes*, Version 2.0, pp. 1-2, Internet: <http://www.sophos.com/sophos/products/full/readmes/readnote.txt> (Retrieved Nov. 30, 2001).

*Trusted Computing Platform Alliance (TCPA), TCPA Design Philosophies and Concepts*, Version 1.0, Internet: <www.trustedpc.org> pp. 1-30 (Jan. 2001).

U.S. Appl. No. 09/728,827, filed Nov. 28, 2000, Proudler et al.

U.S. Appl. No. 09/920,554, filed Aug. 1, 2001, Proudler.

U.S. Appl. No. 10/075,444, filed Feb. 15, 2002, Brown et al.

U.S. Appl. No. 10/080,466, filed Feb. 22, 2000, Pearson et al.

U.S. Appl. No. 10/165,840, filed Jun.7, 2002, Dalton.

U.S. Appl. No. 10/175,185, filed Jun. 18, 2002, Pearson et al.

U.S. Appl. No. 10/175,395, filed Jun. 18, 2002, Pearson et al.

U.S. Appl. No. 10/175,542, filed Jun. 18, 2002, Griffin et al.

U.S. Appl. No. 10/175,553, filed Jun. 18, 2002, Griffin et al.

U.S. Appl. No. 10/206,812, filed Jul. 26, 2002, Proudler.

U.S. Appl. No. 10/240,137, filed Sep. 26, 2002, Dalton et al.

U.S. Appl. No. 10/240,139, filed Sep. 26, 2002, Choo et al.

U.S. Appl. No. 10/303,690, filed Nov. 21, 2002, Proudler et al.

Burke, J.P., "Security Suite Gives Sniffer Programs Hay Fever," *HP Professional*, vol. 8, No. 9, 3 pages total (Sep. 1994).

U.S. Appl. No. 09/979,902, Proudler et al., filed Nov. 27, 2001.

U.S. Appl. No. 09/979,903, Proudler et al., filed Nov. 27, 2001.

U.S. Appl. No. 10/080,476, Proudler et al., filed Feb. 22, 2002.

U.S. Appl. No. 10/080,477, Brown et al., filed Feb. 22, 2002.

U.S. Appl. No. 10/080,478, Pearson et al., filed Feb. 22, 2002.

U.S. Appl. No. 10/080,479, Pearson et al., filed Feb. 22, 2002.

U.S. Appl. No. 10/194,831, Chen et al., filed Jul. 11, 2002.

U.S. Appl. No. 10/208,718, Chen et al., filed Jul. 29, 2002.

U.S. Appl. No. 10/240,138, Choo, filed Sep. 26, 2002.

Barkley, J., et al., "Managing Role/Permission Relationships Using Object Access Types," ACM, pp. 73-80, Jul. 1998, retrieved Jun. 25, 2005.

Bontchev, V., "Possible Virus Attacks Against Integrity Programs and How to Prevent Them," Virus Bulletin Conference, pp. 131-141 (Sep. 1992).

Grimm, R., et al., "Separating Access Control Policy, Enforcement, and Functionality in Extensible Systems," ACM pp. 36-70, Feb. 2001, retrieved Jun. 25, 2005.

Jaeger, T., et al., "Requirements of Role-Based Access Control for Collaborative Systems," ACM, pp. 53-64, Dec. 1996, retrieved Jun. 25, 2005.

Naor, M., et al., "Secure and Efficient Metering," Internet: <http://citeseer.nj.com/naor98secure.html> Sections 1-1.3 (1998).

Radai, Y., "Checksumming Techniques for Anti-Viral Purposes," Virus Bulletin Conference, pp. 39-68 (Sep. 1991).

Schneck, P.B., "Persistent Access Control to Prevent Piracy of Digital Information," *Proceedings of the IEEE*, vol. 87, No. 7, pp. 1239-1250 (Jul. 1999).

"System for Detecting Undesired Alteration of Software," IBM Technical Bulletin, vol. 32, No. 11 pp. 48-50 (Apr. 1990).

Zhang, N.X., et al., "Secure Code Distribution," pp. 76-79, 1997 IEEE, retrieved Jun. 25, 2005.

Ford, B., et al., "Microkernels Meet Recursive Virtual Machines", Operating Systems Review, ACM, vol. 30, No. Special Issue, pp. 137-151 (Dec. 21, 1996).

Goldberg, R.P., "Survey of Virtual Machine Research", Computer, IEEE Service Center, vol. 7, No. 6, pp. 34-45 (Jun. 1974).

Popek, G. J., "Formal Requirements for Virtualizable Third Generation Architechtures", Communications of the Association for Computing Machinery, ACM, vol. 17, No. 7, pp. 412-421 (Jul. 1974).

* cited by examiner

MULTIPLE TRUSTED COMPUTING ENVIRONMENTS WITH VERIFIABLE ENVIRONMENT IDENTITIES

CROSS REFERENCE TO RELATED APPLICATIONS

The subject matter of the present application may also be related to the following U.S. patent applications: "Operation of Trusted State in Computing Platform," Ser. No. 09/728,827, filed Nov. 28, 2000; "Performance of a Service on a Computing Platform," Ser. No. 09/920,554, filed Aug. 1, 2001; "Secure E-Mail Handling Using a Compartmented Operating System," Ser. No. 10/075,444, filed Feb. 15, 2002; "Electronic Communication," Ser. No. 10/080,466, filed Feb. 22, 2002; "Demonstrating Integrity of a Compartment of a Compartmented Operating System," Ser. No. 10/165,840, filed Jun. 7, 2002; "Renting a Computing Environment on a Trusted Computing Platform," Ser. No. 10/175,185, filed Jun. 18, 2002; "Interaction with Electronic Services and Markets," Ser. No. 10/175,395, filed Jun. 18, 2002; "Multiple Trusted Computing Environments," Ser. No. 10/175,542, filed Jun. 18, 2002; "Performing Secure and Insecure Computing Operations in a Compartmented Operating System," Ser. No. 10/175,553, filed Jun. 18, 2002; "Privacy of Data on a Computer Platform," Ser. No. 10/206,812, filed Jul. 26, 2002; "Trusted Operating System," Ser. No. 10/240,137, filed Sep. 26, 2002; "Trusted Operating System," Ser. No. 10/240,139, filed Sep. 26, 2002; and "Apparatus and Method for Creating a Trusted Environment," Ser. No. 10/303,690, filed Nov. 21, 2002.

The present invention relates in general to a method for providing multiple computing environments running on a single host computing platform, and relates to a method for verifying integrity of the computing environments.

It is desired to run multiple applications on a single host computing platform such as a server. To minimise interference between applications which are incompatible or which do not trust each other, it is known to provide multiple computing environments which are separate and logically distinct. It is desired to provide a high degree of isolation between the multiple computing environments, and ideally it is desired to verify the integrity of one computing environment independently of any other computing environment, such that each computing environment is independently trustworthy.

A problem has been identified in that it is desired to confirm that the supplied integrity information corresponds to an expected computing environment (and is not based on some other subverted computing environment). An aim of the present invention is to provide a method for verifying the integrity of a computing environment, including verifying that the integrity information provided corresponds to the expected computing environment. Another aim is to provide a computing platform for performing the method.

According to a first aspect of the present invention there is provided a method for verifying integrity of a computing environment, comprising the steps of: identifying a computing environment which it is desired to verify; obtaining an integrity metric associated with the identified computing environment; signing the integrity metric with a signature key, to form a signed integrity metric, the signed integrity metric including information identifying a computing environment; and transmitting the signed integrity metric to a challenger.

The method preferably is initiated by the step of receiving an integrity challenge from the challenger. Preferably, the integrity challenge includes challenge information identifying a computing environment which it is desired to verify. Preferably, the challenge information includes a computing environment identity label. Preferably, the identity label is an external computing environment identity label. Conveniently the method includes the initial step of supplying the external computing environment identity label to the challenger, prior to the challenger issuing the identity challenge.

In one preferred embodiment the integrity challenge is received from the challenger and passed through a computing environment, suitably toward a component of a host computing platform which is arranged to co-operate in the verifying method. In this case, the information identifying a computing environment which is returned as part of the signed integrity metric comprises information identifying the challenging computing environment which passes the integrity challenge and/or information identifying a computing environment which it is desired to verify. That is, the challenging computing environment passing the challenge can be identified, and this challenging computing environment can be the same as or different to a computing environment which it is desired to verify. Suitably, an identity label is used to identify the challenging computing environment and/or the computing environment to verify. Preferably, the identity label is an internal computing environment identity label, for use within the host computing platform. Conveniently, the method includes an initial step of applying the internal computing environment identity label to the computing environment, prior to receiving the integrity challenge.

The method preferably includes checking that an identity label received in the integrity challenge corresponds to an identity label of a computing environment passing the integrity challenge. Preferably, the method includes confirming that a computing environment passing the integrity challenge has authorisation to request verification of a computing environment which it is desired to verify. Preferably, the confirming step comprises restricting authorisation of a computing environment passing a challenge only to request verification of that computing environment. Alternatively, the confirming step comprises selectively restricting the computing environment passing the integrity challenge to request verification of another computing environment.

Preferably, the step of identifying a computing environment which it is desired to verify uses identity information supplied in an integrity challenge from a challenger and/or uses identity information about a computing environment which passes the integrity challenge. Preferably, the identity information is an external computing environment label or an internal computing environment label.

In a second embodiment the method comprises the step of selecting one of a plurality of signature keys, the one signature key being associated with the identified computing environment. Preferably, the signing step comprises signing the integrity metric with the selected signature key. Conveniently, the method includes an initial step of supplying a verifying signature key to a challenger. Preferably, the verifying signature key and the signing signature key form a complimentary public key and private key pair.

In a particularly preferred embodiment, the signing step includes forming the signed integrity metric with an external data field, the external data field including the information identifying a computing environment. Suitably, the method includes the step of receiving an integrity challenge from a challenger, the integrity challenge including external data; and forming a hash function of the received external data and the information identifying the computing environment, to form the external data field of the signed integrity metric. Preferably, the information comprises a computing environment identity label of the computing environment associated with the integrity metric. Preferably, the computing environment identity label is an internal computing environment identity label or an external computing environment identity label. Additionally or alternatively, the information includes a challenging identity label of a computing environment which passes an integrity challenge. Preferably, the challenging identity label is an internal computing environment identity label or an external computing environment identity label. Preferably, the information includes both a computing environment identity label identifying a computing environment associated with the integrity metric, and a challenging computing environment label identifying a computing environment which passes an integrity challenge. Preferably, the information includes an identity of a virtual machine application running in or forming the computing environment. Preferably, the information includes an identity of a guest operating system provided by the virtual machine application. Preferably, the information includes an identity of at least one process running on the guest operating system.

In each of the above embodiments, the method preferably includes the final step of verifying the signed integrity metric received by the challenger. Preferably, the verifying step includes verifying the signature of the signed integrity metric. Preferably, verifying the signature uses a verifying signature key. When applied to the second preferred embodiment, preferably, the verifying signature key and the signing signature key form a corresponding public key and private key pair.

Preferably, the verifying step includes verifying the information identifying a computing environment. Preferably, this step includes verifying an identity of a computing environment associated with the integrity metric of the signed integrity metric. Also, the verifying step can include verifying an identity of a challenging computing environment which passes an integrity challenge. Preferably, the verifying step uses an internal identity label and/or an external identity label associated with a computing environment.

Preferably, the verifying step includes verifying the integrity metric of the signed integrity metric. Preferably, the verifying step comprises comparing the signed integrity metric against expected values.

Suitably, the or each computing environment is one of a plurality of computing environments provided on a single host computing platform. Preferably, the computing environment which it is desired to verify and, optionally, the computing environment passing the integrity challenge, are each one of a plurality of computing environments provided on the single host computing platform. Preferably, the integrity metric or group of integrity metrics comprise one or more integrity metric values each stored in a platform configuration register of a trusted device. Preferably, the method includes an initial step of forming an integrity metric or group of integrity metrics for the or each computing environment, and storing the integrity metric or group of integrity metrics as one or more integrity metric values each in a platform configuration register of a trusted device.

According to a second aspect of the present invention there is provided a computing platform supporting at least one computing environment, the computing platform comprising: a trusted device unit arranged to identify a computing environment which it is desired to verify, obtain an integrity metric associated with the identified computing environment, sign the integrity metric with a signature key, to form a signed integrity metric, the signed integrity metric including information identifying a computing environment, and transmitting the signed integrity metric to a challenger.

Preferably, the trusted device unit comprises a trusted device and a trusted device driver. Preferably, the trusted device driver is arranged to receive an integrity challenge from a challenger, identify a computing environment which it is desired to verify, and transmit the signed integrity metric to the challenger; and the trusted device is arranged to retrieve a stored integrity metric associated with the identified computing environment, and sign the integrity metric with the signature key. Preferably, the trusted device is arranged to store a plurality of signature keys, and is arranged to select one of the signature keys associated with the identified computing environment.

Preferably, the trusted device is arranged to form the signed integrity metric including an external data field which includes the information identifying a computing environment. Preferably, the trusted device receives the integrity challenge including an external data from the challenger, and is arranged to form the external data field of the signed integrity metric using a hash function of the received external data and the information identifying a computing environment. Preferably, the computing platform supports a plurality of computing environments, and one of the plurality of computing environments is identified.

For a better understanding of the invention, and to show how embodiments of the same may be carried into effect, reference will now be made, by way of example, to the accompanying diagrammatic drawings in which.

The preferred embodiment of the present invention will be particularly described and explained with reference to FIG. 7 below. However, as background to the present invention and to show the preferred embodiment in combination with other aspects of the invention in a preferred practical application, the following description is provided with reference to FIGS. 1 to 6.

Figure 1:
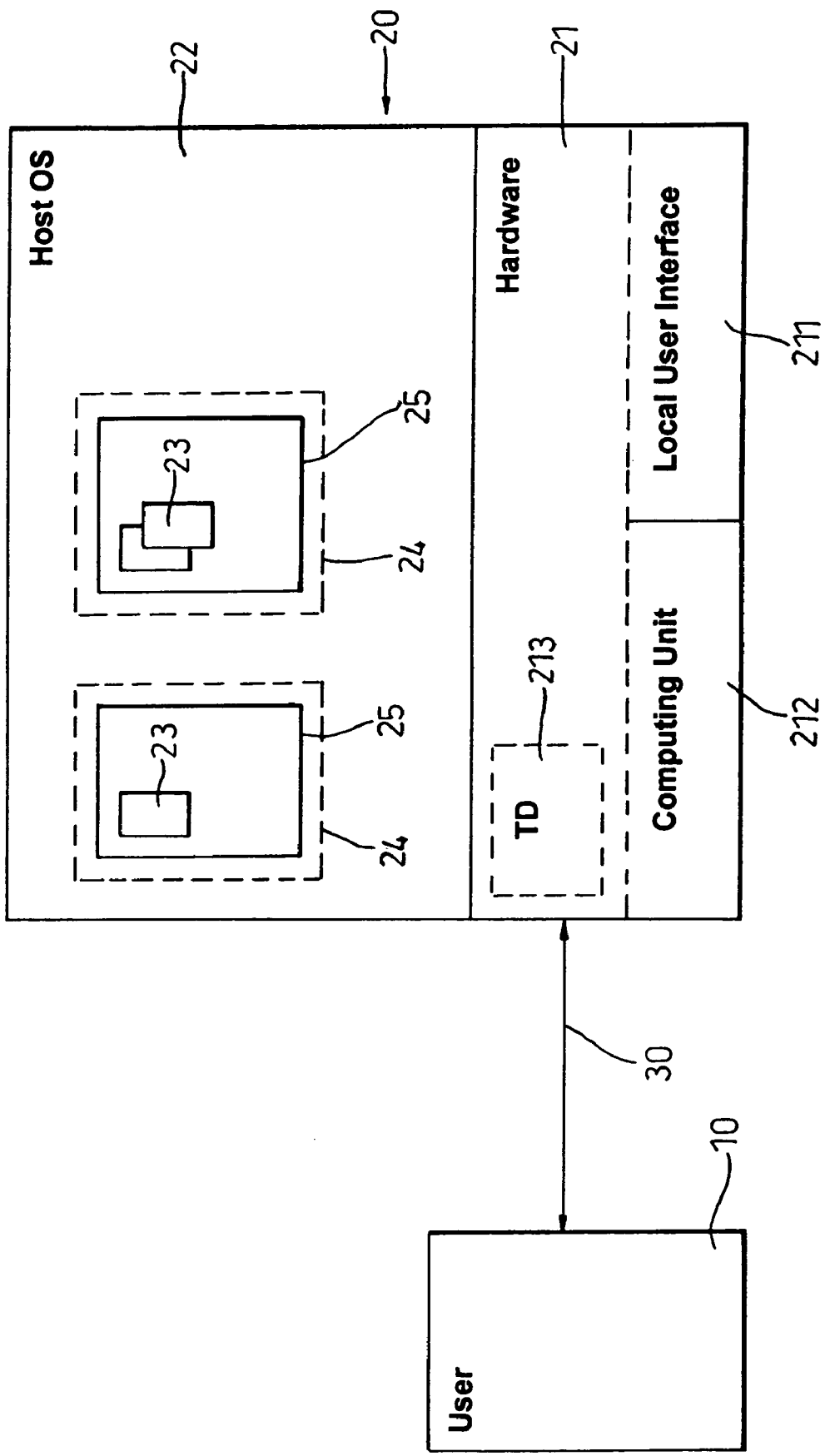
FIG. 1 shows a preferred computing platform.

FIG. 1 shows a computing platform 20 employed in preferred embodiments of the present invention. The computing platform 20 comprises hardware 21 operating under the control of a host operating system 22. The hardware 21 may include standard features such as a keyboard, a mouse and a visual display unit which provide a physical user interface 211 to a local user of the computing platform. The hardware 21 also suitably comprises a computing unit 212 comprising a main processor, a main memory, an input/output device and a file storage device which together allow the performance of computing operations. Other parts of the computing platform are not shown, such as connections to a local or global network. This is merely one example form of computing platform and many other specific forms of hardware are applicable to the present invention.

In the preferred embodiment the hardware 21 includes a trusted device 213. The trusted device 213 is suitably a physical component such as an application specific integrated circuit (ASIC). Preferably the trusted device is mounted within a tamper-resistant housing. The trusted device 213 is coupled to the computing unit 212, and ideally to the local user interface unit 211. The trusted device 213 is preferably mounted on a motherboard of the computing unit 212. The trusted device 213 functions to bind the identity of the computing platform 20 to reliably measured data that provides an integrity metric of the platform.

Preferably, the trusted device 213 performs a secure boot process when the computing platform 20 is reset to ensure that the host operating system 22 of the platform 20 is running properly and in a secure manner. During the secure boot process, the trusted device 213 acquires an integrity metric (or a group of integrity metrics) of the computing platform 20, such as by examining operation of the computing unit 212 and the local user interface unit 211. The integrity metrics are then available for a user to determine whether to trust the computing platform to operate is a predicted manner. In particular, a trusted computing platform is expected not to be subject to subversion such as by a virus or by unauthorised access. The user includes a local user of the computing platform, or a remote user communicating with the computing platform by networking (including LAN, WAN, internet and other forms of networking).

WO 00/48063 (Hewlett-Packard) discloses an example computing platform suitable for use in preferred embodiments of the present invention. In this example the trusted device 213 acquires a hash of a BIOS memory of the computing unit 212 after reset. The trusted device 213 receives memory read signals from the main processor and returns instructions for the main processor to form the hash. The hash is stored in the trusted device 213, which then returns an instruction that calls the BIOS program and a boot procedure continues as normal.

Preferably, the trusted device 213 controls the local user interface 211 such that a local user can trust the display of data provided on a visual display unit. WO 00/73913 (Hewlett-Packard) discloses an example system for providing a trustworthy user interface by locating a driver for the visual display unit within the trusted device 213.

The hardware 21 may also comprise a trusted user interface for performing secure communication with a user device such as a smart card held by the user. The trusted user interface allows the user to perform trusted communications with the trusted device 213 in order to verify the integrity of the computing platform 20. The use of a smart card or other token for trusted user interaction is described in more detail in WO 00/54125 (Hewlett-Packard) and WO 00/54126 (Hewlett-Packard).

FIG. 1 shows a user 10 such as a remote client which is arranged to communicate with the computing platform 20, preferably over a secure channel 30. The secure channel 30 is protected, for example, using a shared session key, which is a secret which is known only to the computing platform 20 and the user 10. Providing a secure channel including generation of a shared session key will be familiar to the person skilled in the art. Ideally, the user 10 performs an integrity challenge to confirm that communication is made with an expected computing platform 20, using a signature provided by the trusted device 213. However, any suitable authentication can be employed.

The computing platform 20 provides a computing environment 24 which gives access to resources of the computing platform, such as processor time, memory area, and filespace. Preferably, a plurality of discrete computing environments 24 are provided. Each computing environment is logically distinct, but shares access to at least some of the resources of the computing platform with other computing environments.

Suitably, the computing environment 24 comprises a compartment. The actions or privileges within a compartment are constrained, particularly to restrict the ability of a process to execute methods and operations which have effect outside the compartment, such as methods that request network access or access to files outside of the compartment. Also, operation of the process within the compartment is performed with a high level of isolation from interference and prying by outside influences.

Preferably, the compartment is an operating system compartment controlled by a kernel of the host operating system 22. This is also referred to as a compartmented operating system or a trusted operating system.

Compartmented operating systems have been available for several years in a form designed for handling and processing classified (military) information, using a containment mechanism enforced by a kernel of the operating system with mandatory access controls to resources of the computing platform such as files, processes and network connections. The operating system attaches labels to the resources and enforces a policy which governs the allowed interaction between these resources based on their label values. Most compartmented operating systems apply a policy based on the Bell-LaPadula model discussed in the paper "Applying Military Grade Security to the Internet" by C I Dalton and J F Griffin published in Computer Networks and ISDN Systems 29 (1997) 1799–1808.

The preferred embodiment of the present invention adopts a simple and convenient form of operating system compartment. Each resource of the computing platform which it is desired to protect is given a label indicating the compartment to which that resource belongs. Mandatory access controls are performed by the kernel of the host operating system to ensure that resources from one compartment cannot interfere with resources from another compartment. Access controls can follow relatively simple rules, such as requiring an exact match of the label.

Examples of resources include data structures describing individual processes, shared memory segments, semaphores, message queues, sockets, network packets, network interfaces and routing table entries.

Communication between compartments is provided using narrow kernel level controlled interfaces to a transport mechanism such as TCP/UDP. Access to these communication interfaces is governed by rules specified on a compartment by compartment basis. At appropriate points in the kernel, access control checks are performed such as through the use of hooks to a dynamically loadable security module that consults a table of rules indicating which compartments are allowed to access the resources of another compartment. In the absence of a rule explicitly allowing a cross compartment access to take place, an access attempt is denied by the kernel. The rules enforce mandatory segmentation across individual compartments, except for those compartments that have been explicitly allowed to access another compartment's resources. Communication between a compartment and a network resource is provided in a similar manner. In the absence of an explicit rule, access between a compartment and a network resource is denied.

Suitably, each compartment is allocated an individual section of a file system of the computing platform. For example, the section is a chroot of the main file system. Processes running within a particular compartment only have access to that section of the file system. Through kernel controls, the process is restricted to the predetermined section of file system and cannot escape. In particular, access to the root of the file system is denied.

Advantageously, a compartment provides a high level of containment, whilst reducing implementation costs and changes required in order to implement an existing application within the compartment.

Referring to FIG. 1, it is desired to run a process 23 in one of the computing environments 24. In practical embodiments, many processes run on the computing platform simultaneously. Some processes are grouped together to form an application or service. For simplicity, a single process will be described first, and the invention can then be applied to many processes and to groups of processes.

Figure 2:
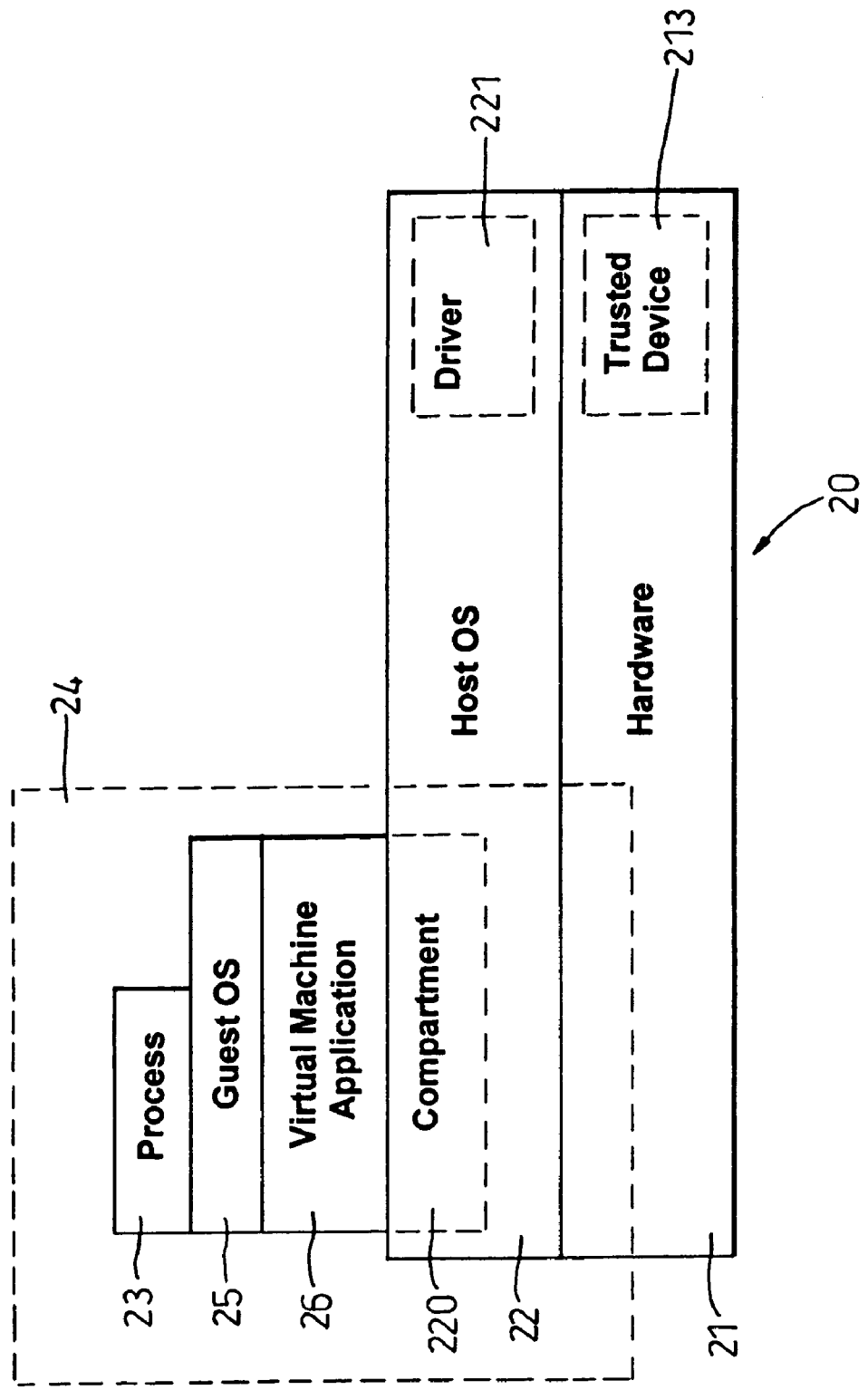
FIG. 2 shows a preferred computing environment.

FIG. 2 shows a logical structure for a preferred computing environment 24 provided by the computing platform for running the process 23.

The process 23 runs on a guest operating system 25. The guest operating system 25 is suitably provided by a virtual machine application 26. The virtual machine application 26 runs on the host operating system 22 and provides an image of a computing platform, or at least appropriate parts thereof. The virtual machine application 26 provides the virtual guest operating system 25 such that, as far as the process 23 is concerned, the process 23 runs on the guest operating system 25 equivalent to running on a host operating system 22. For the purposes of the present invention, the guest operating system 25 is preferably a replica of the host operating system, or at least necessary parts thereof. However, it is equally possible for the virtual machine application 26 to provide a different emulated software or hardware environment, such as a different operating system type or version. An example virtual machine application is sold under the trade mark VMware by VMware, Inc of Palo Alto, Calif., USA.

The virtual machine application 26 assists security by isolating the process 23 from the remainder of the computing platform. Should problems occur during running of the process 23 or as a result thereof, the host operating system 22 can safely shut down the guest operating system 25 provided by the virtual machine application 26. Also, the virtual machine application 26 protects the host operating system 22 and hardware resources 21 from direct access by the process 23. Therefore, it is very difficult for the process 23 to subvert the host operating system 22. Further, the process 23 accesses resources of the computing platform made available through the virtual machine application 26. Each process 23 only sees resources of the computing platform allocated through the virtual machine application 26, such that a process 23 can be restricted to an appropriate share of the resource of the computing platform and cannot stop other processes having their allocated share.

Preferably, the virtual machine application 26 providing the guest operating system 25 runs in a compartment 220 of the host operating system 22. The compartment confines communications and data access of the virtual machine application. The compartment 220 provides secure separation between applications, such that processes are inhibited from communicating with each other, accessing each others status, or interfering with each other, except in accordance with strictly enforced access controls. In particular, a compartment assists the virtual machine application in resisting subversion by a process running in that computing environment.

Referring again to FIG. 2, the process 23 runs in the computing environment 24. It is desired to confirm the integrity of this computing environment. Also, many similar computing environments can be provided on the computing platform simultaneously, and it is desired to confirm the integrity of one selected computing environment independently of the integrity of any other computing environment. That is, it is desired that the multiple computing environments are independently trustworthy. Advantageously, the use of a guest operating system 25, preferably in combination with a compartment 220, provides a high degree of isolation between computing environments, such that the integrity of one computing environment is not affected by activity in any other computing environment.

As described above, the trusted device 213 is arranged to form an integrity metric (or a group of integrity metrics) of the host operating system 22. Also, in the preferred embodiments of the present invention, the trusted device 213 is arranged to obtain an integrity metric (or a group of integrity metrics) for each computing environment 24. Preferably, the trusted device 213 obtains an integrity metric of the guest operating system 25. Further, the trusted device preferably obtains an integrity metric of the virtual machine application 26. Each integrity metric suitably comprises one or more separate integrity metric values.

In the preferred configuration the host operating system 22 has direct access to the trusted device 213. However, to improve security, processes (i.e. applications) running on the host operating system 22 do not have direct access to the trusted device 213. Therefore, a trusted device driver 221 is provided, suitably as part of the host operating system 22. The trusted device driver 221 provides an interface available to applications running on the host operating system 22, including allowing results to be reported to the trusted device 213, and allowing stored integrity metric values to be obtained from the trusted device 213.

Figure 3:
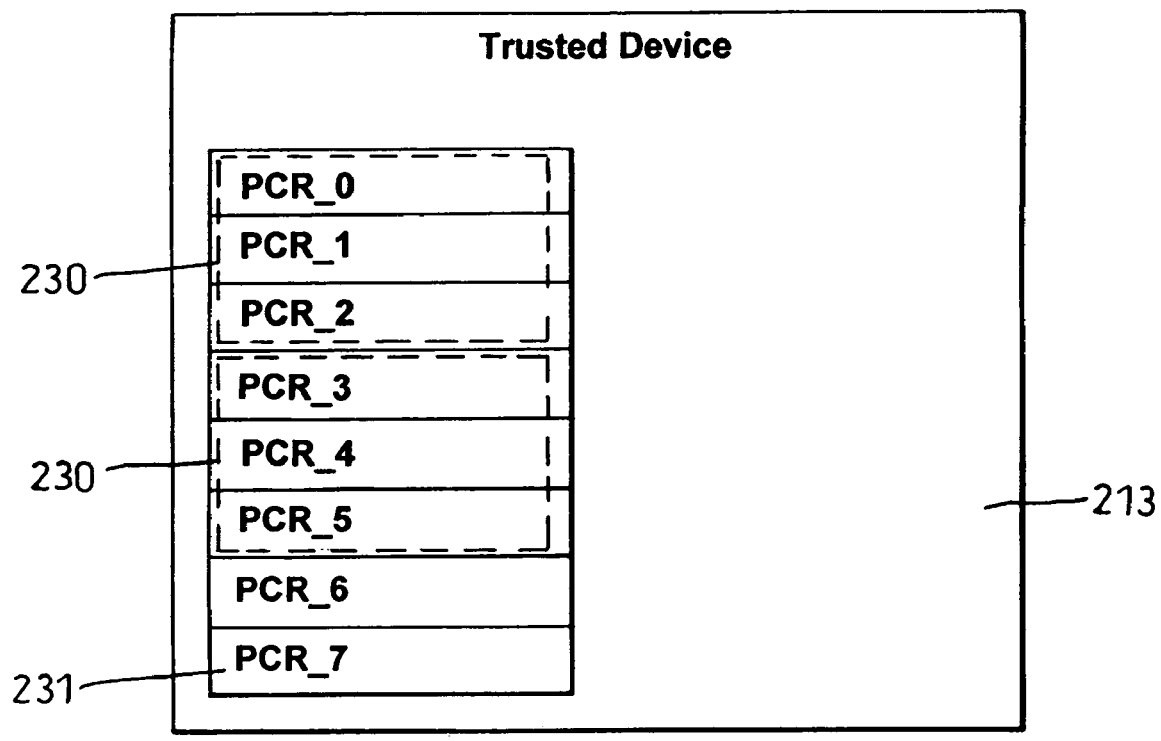
FIG. 3 shows an example trusted device.

FIG. 3 shows a simplified example of the preferred trusted device 213. Amongst other components the trusted device 213 comprises an addressable storage such as a plurality of platform configuration registers (PCRs). In this example eight PCRs are shown, namely PCR_0 to PCR_7 although in practice many more PCRs are available. Suitably, each PCR stores a digest such as a 160 bit hash value representing an integrity metric 231. A group of PCRs form a group of integrity metrics 230. Suitably, the trusted device driver 221 allocates a PCR, or a group of PCRs, to the or each computing environment 24. Therefore, information concerning the integrity of each computing environment is independently available from the trusted device 213.

The stored integrity metric value 231 preferably represents a sequence of integrity metric values obtained, for example, by examination of the host platform 20 periodically or in response to relevant events. The old stored integrity metric value is combined with a new integrity metric value to produce a new updated digest of the sequence of values.

Figure 4:
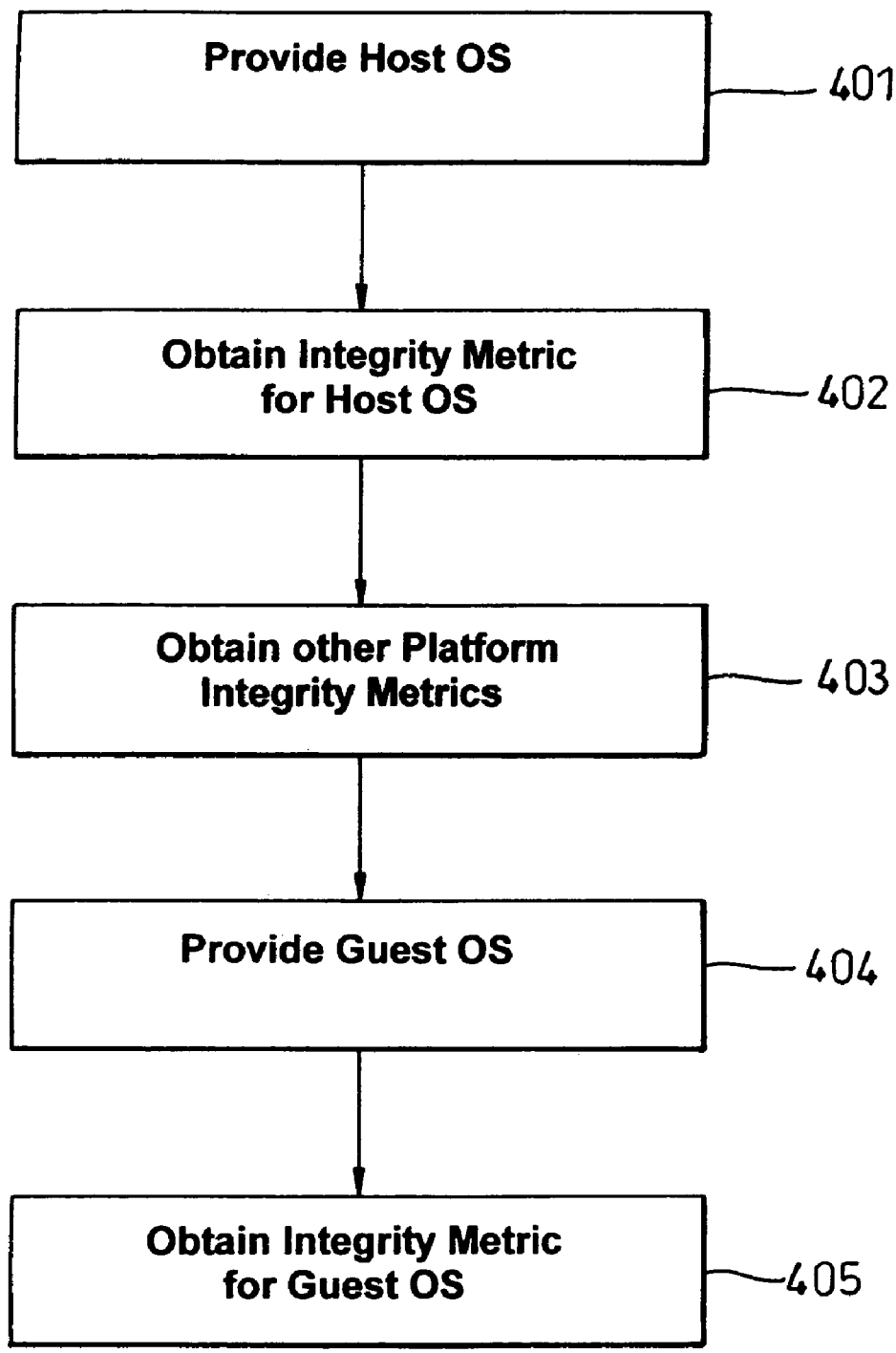
FIG. 4 shows a method for obtaining integrity metrics for multiple trusted computing environments.

FIG. 4 shows a preferred method for obtaining integrity metrics of a computing platform for providing multiple trusted computing environments.

In step 401, the host operating system 22 is provided. Suitably, this includes the steps of starting a BIOS, starting an OS loader, and starting the host operating system as will be familiar to the skilled person.

In step 402, a group of integrity metrics 230 for the host operating system 22 are measured and reported to the trusted device 213. Preferably, the trusted device 213 obtains an integrity metric for the BIOS, and preferably also obtains an integrity metric for the OS loader and the operating system software. Preferably, integrity metric values relevant to the host operating system are stored in a group of PCRs (or other addressable storage) such that the integrity metrics 230 for the host operating system are available later. Steps 401 and 402 are shown separately for clarity. In practical embodiments of the invention it will be appreciated that the integrity metrics 230 are obtained concurrently with providing the host OS 22.

Optionally, at step 403 additional integrity metrics are obtained relevant to other selected elements of the computing platform. For example, the trusted device 213 performs data event logging as described in WO 00/73880 (Hewlett-Packard). Also, the trusted device 213 may produce a digest by applying a hash function to all or selected data files stored on the computing platform, as described in WO 00/73904 (Hewlett-Packard). Preferably, at least some of the integrity metrics obtained in step 402 or step 403 are updated periodically or in response to relevant events to confirm the current integrity status of the host operating system and related components of the computing platform.

In step 404, a guest operating system 25 is provided, to form a new computing environment 24. Suitably, step 404 includes providing a virtual machine application 26 which provides the guest operating system 25.

Preferably, the step 404 includes providing the guest operating system 25 in a compartment 220 of the host operating system 22. Also, the step 404 preferably includes providing a history of all processes (applications) launched in the compartment. Here, it is desired to record whether any other applications have been launched alongside the virtual machine application 26 which provides the guest operating system 25.

In step 405, the trusted device 213 obtains an integrity metric for the computing environment 24. In particular, the trusted device 213 obtains an integrity metric or group of integrity metrics 230 for the guest operating system 25, and preferably the virtual machine application 26. The corresponding integrity metric values 231 are stored in a PCR or group of PCRs allocated to that computing environment. Also, the step 405 preferably includes obtaining an integrity metric for the or each process 23 in the computing environment. Suitably, each integrity metric is obtained by forming a digest (hash value) of program code of a process. As will be familiar to the skilled person, the term integrity metric can refer to a single data item, or can refer to a metric formed from two or more parts each of which themselves can be considered an integrity metric.

Preferably, step 405 is repeated such that a current integrity status of the computing environment is available and history information is updated, periodically or in response to a relevant event.

When it is desired to create or update a stored integrity metric for a particular computing environment, a result is reported to the trusted device driver 221 along with information identifying that particular computing environment, such as an arbitrary label. In one preferred embodiment a process ID of the virtual machine application 26 is used to identify the computing environment. In another embodiment each logical computing environment is supplied with a secret, e.g. a secret is supplied to the virtual machine application 26 by the trusted device driver 221, and then the secret is subsequently used to identify the computing environment. Suitably the computing environment label, such as a secret, is supplied by the host OS 22 when the virtual machine application 26 is launched.

Figure 5:
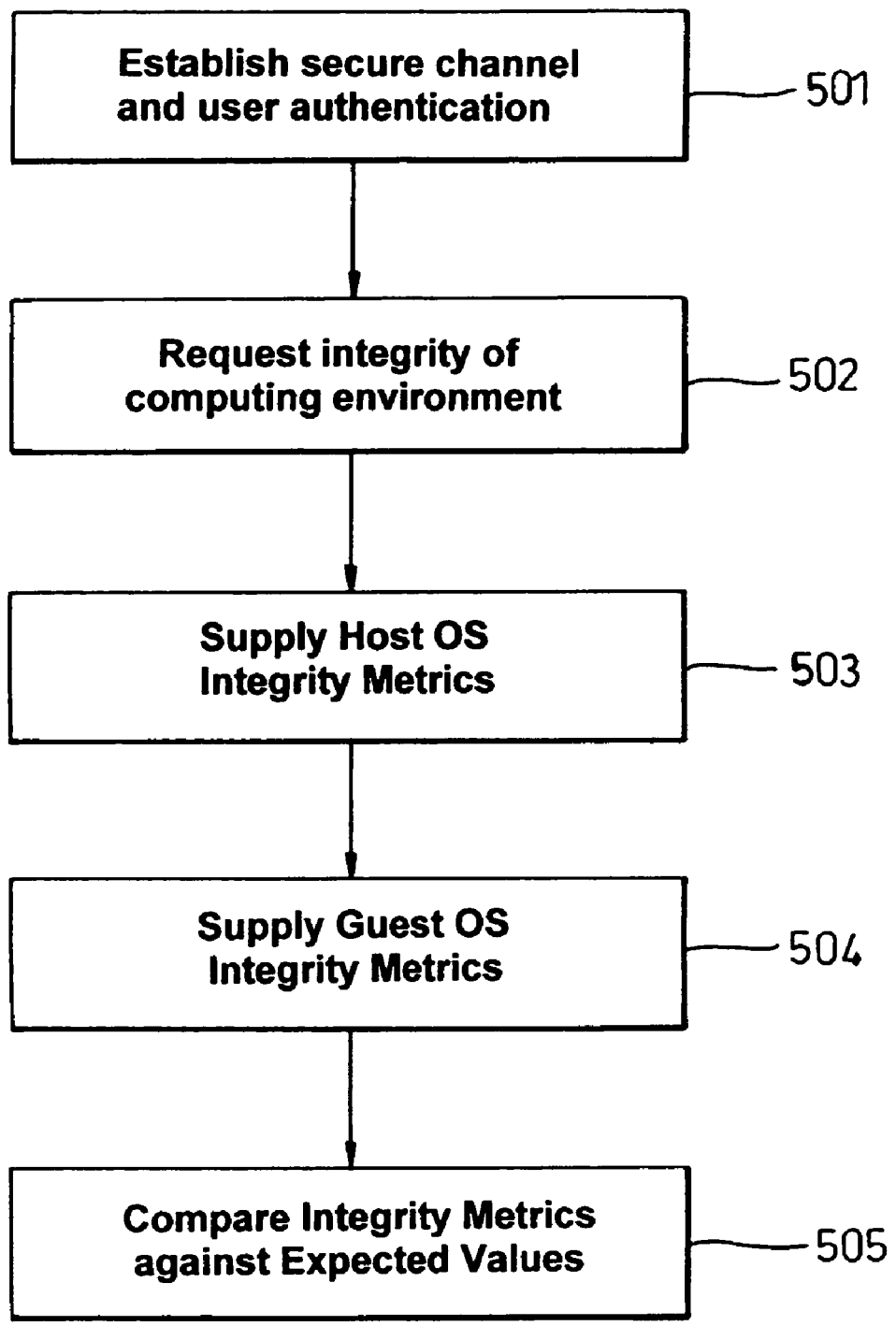
FIG. 5 shows a method for verifying multiple trusted computing environments.

Referring to FIG. 5, a preferred method for verifying a computing environment will now be described.

Optionally, in step 501 a secure channel is established for communicating with the computing platform 20. For a local user 10, a secure channel is provided such as by using a trustworthy user interface and/or by using a token such as a smart card. A remote user 10 establishes a secure channel 30 such as by performing authentication of the computing platform, ideally using a signature from the trusted device 213. Here again, the user optionally employs trusted hardware, such as the user's own client platform, a PDA, mobile phone or other device, optionally in co-operation with a smart card or other token. Preferably, the step 501 includes establishing the authentication and authorisation of the user.

In step 502, the user 10 requests demonstration of the integrity of a computing environment 24. For example, the user 10 issues an integrity challenge. To avoid a re-play attack, the challenge suitably includes a random number sequence (nonce). More detailed background information is provided in "TCPA Specification Version 1.0" published by the Trusted Computing Platform Alliance.

In step 503 the trusted device 213 supplies integrity metrics associated with the host operating system 22. Suitably, these integrity metrics include integrity metrics for the BIOS, operating system loader and host operating system, and integrity metrics formed by periodic or event-driven checks on the host operating system and related components of the computing platform.

In step 504, the trusted device 213 supplies an integrity metric associated with the selected computing environment. Preferably, the step 504 includes supplying integrity metrics associated with the virtual machine application 26, the guest operating system 25, the process 23, and a history of periodic or event-driven checks made on the integrity status of the computing environment 24.

The step 504 preferably includes supplying a history of any applications launched by the host operating system in the same compartment as the guest operating system, i.e. alongside the virtual machine application 26.

Preferably, in step 505 the integrity metric for the host operating system 22 and the computing environment 24 are compared against expected values, such as by using a certificate issued by a trusted party that is prepared to vouch for the integrity of the computing platform. If the comparison is successful, the computing environment is considered to be a trusted computing environment.

The apparatus and methods described above provide integrity information concerning a selected one of the multiple computing environments. However, a problem has been identified in that it is desired to confirm that the supplied integrity metrics correspond to an expected computing environment (and are not based on some other computing environment). In particular, it is desired to confirm that a process 23 is running in an expected computing environment 24, by receiving integrity information identified as being specific to that computing environment.

Figure 6:
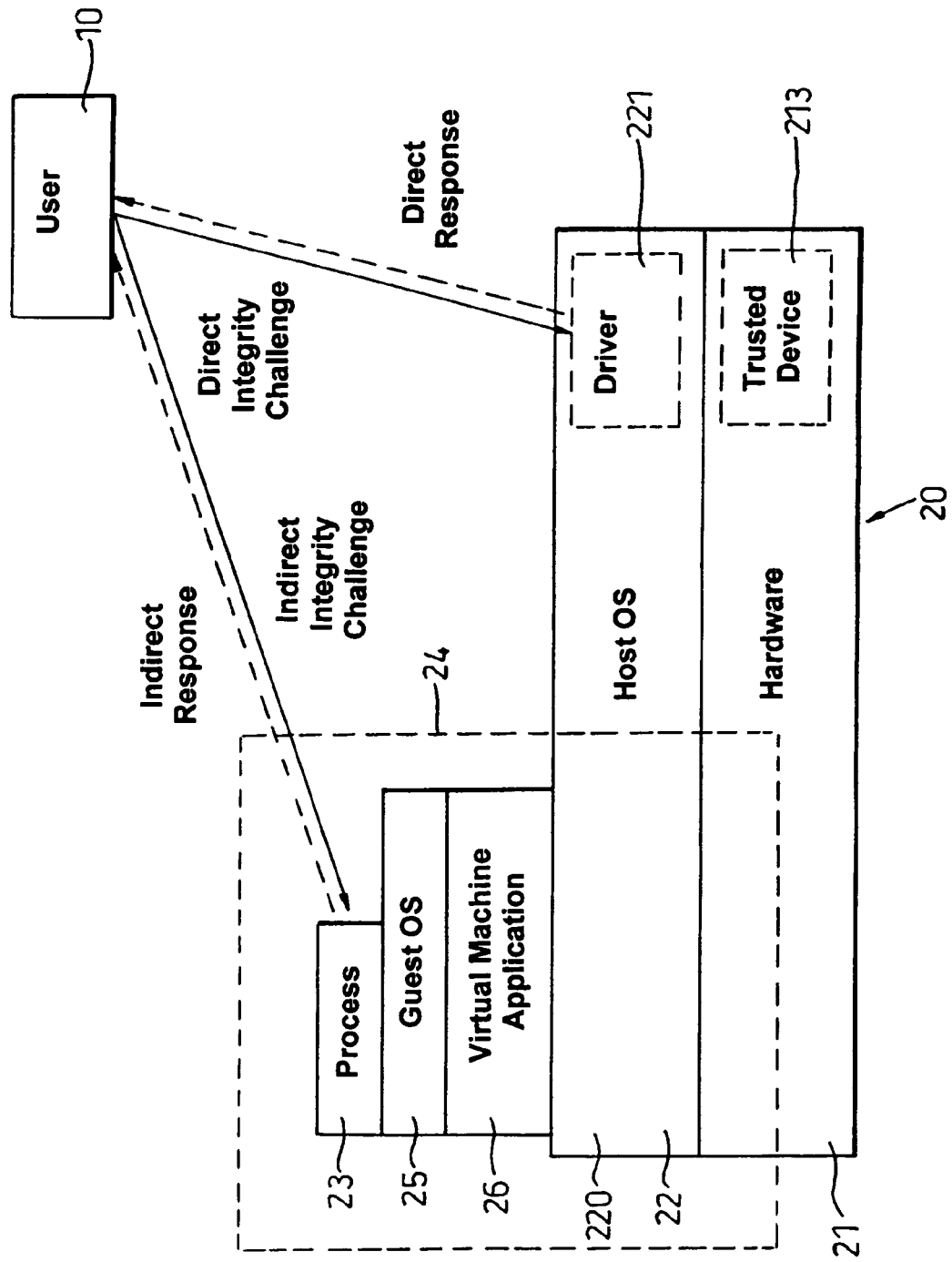
FIG. 6 shows a preferred computing platform communicating with a user.

FIG. 6 shows the preferred computing platform of FIG. 2 communicating with a user 10, to perform the method of FIG. 5. As discussed above in step 502, the user 10 issues a request for verification of the integrity of a computing environment 24, suitably in the form of an integrity challenge.

In a first example, the integrity challenge is issued direct to a component of the host operating system 22, such as the trusted device driver 221. In this embodiment, the integrity challenge includes information previously given to the user 10, such as an arbitrary label, which allows the trusted device driver 221 to establish the relevant computing environment 24. The external computing environment identity label given to the user 10 may be the same as, or complementary to, any information held internally identifying the computing environment. Suitably, the external identity information supplied as part of the integrity challenge is matched against a list of computing environments currently provided on the host operating system, this step ideally being performed by the trusted device driver 221. Suitably, there is a one to one relationship between the compartment identity label as given to the user 10, and any compartment identity label used internally in the host computing platform 20. In step 504 the trusted device 213 supplies an integrity metric or group of integrity metrics 230 associated with the identified computing environment 24. Suitably, a response is returned directly to the challenging user 10.

In a second preferred example, an indirect integrity challenge is issued from the user 10 and is received by a component of the relevant computing environment 24, such as the process 23 which suitably forms part of an application running in that computing environment 24. The integrity challenge is passed from the computing environment 24 to the trusted device driver 221. In this case, the trusted device driver 221 can readily establish the identity of the computing environment 214 passing the integrity challenge. In one example embodiment the computing environment 24 supplies an internal computing environment identity label such as a process ID of the virtual machine application 26, or a secret previously given to the virtual machine application 26 by the host operating system 22. In step 504 the trusted device 213 supplies integrity metrics associated with that computing environment 24. Suitably, a response is returned to the challenging user 10 indirectly through components of the computing environment 24 which received the indirect integrity challenge. Alternatively, the response can be sent direct to the challenging user 10.

Figure 7:
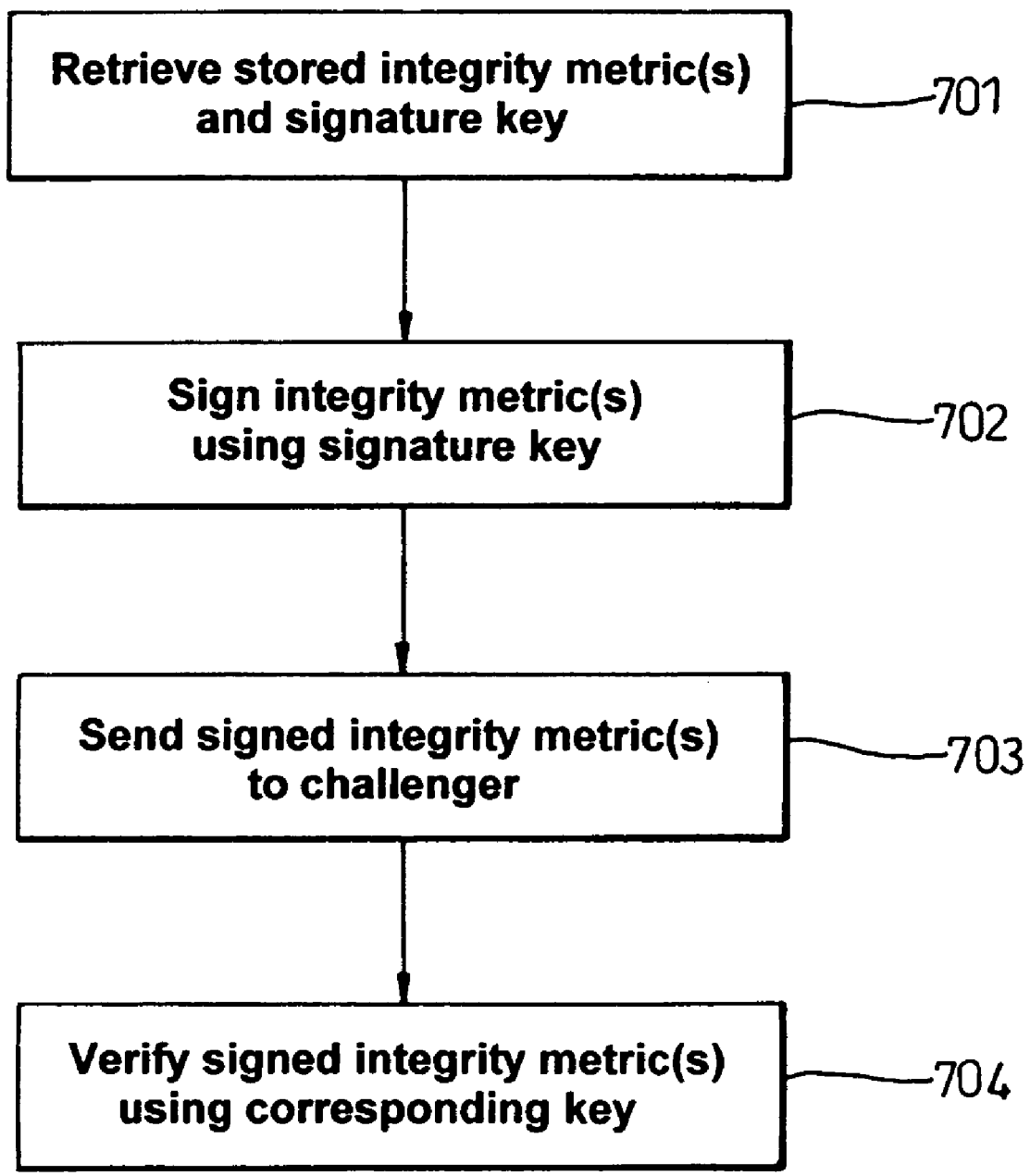
FIG. 7 shows a preferred method for verifying a computing environment.

FIG. 7 provides an overview of preferred methods for verifying that integrity information corresponds to an expected computing environment. The following preferred methods can be used individually or in combination.

Step 701 comprises retrieving integrity metric values stored within the trusted device 213. Suitably, the integrity metric values are retrieved from one or more PCRs. These integrity metric values correspond to the integrity metric or group of integrity metrics for a particular computing environment. Optionally, as described above, other integrity metrics or groups of integrity metrics are obtained for the host operating system and other selected parts of the computing platform, as desired.

Step 702 comprises signing the integrity metrics or group of integrity metrics (e.g. combined to form a digest) using a signature key held by the trusted device, to form a signed integrity metric. The signed integrity metric includes information identifying a computing environment.

In step 703 the signed integrity metric is transmitted to the challenger, i.e. the user 10.

In step 704 the challenger verifies the received signed integrity metric. Suitably, the challenger holds a verifying signature key which corresponds to the signing signature key used to the sign the integrity metric. The challenger verifies the signature, and can then check the integrity metric values.

In a first preferred method for passing computing environment identity information, the signed integrity metric includes an external data field which is adapted to identify the computing environment. The external data field is intended to minimise the risk of a replay attack by returning an external data value to the challenging user 10, the external data value being generated originally by the user 10 and supplied to the computing platform when issuing the integrity challenge. In the most common examples this external data value is a random number (nonce), or is a time value or a serial number allocated to the user. In this first embodiment the external data field is replaced by a hash function combining the supplied external data with information identifying the computing environment. For example, the signature in step 702 is formed with:

externaldata=h(supplied_externaldata, compartment_ID), where "h" is a hash function. Suitably, the user 10 performs a checking process of the hash function in order to retrieve the supplied_externaldata and compartment_ID fields from the externaldata field in the received integrity information. The supplied_externaldata field can be used as in the established system as a defence against a replay attack, and the compartment_ID field is used to identify the received integrity information as being specific to a particular computing environment. The compartment_ID field is compared against an expected value, to confirm that the received integrity information corresponds to the expected computing environment. That is, the integrity information provided to the user is identified as being specific to the computing environment of interest to the user.

As mentioned above with reference to FIG. 6, an integrity challenge can either be issued directly to a component of the host operating system as in the first example, or indirectly through a particular computing environment as in the second example.

Where the challenge is issued directly, then suitably the user supplies the external computing environment identity label as part of the integrity challenge, and the compartment_ID field is used to return the supplied external label to the user, such that the user can then confirm that the supplied integrity information corresponds to an expected computing environment.

Where the integrity challenge is issued indirectly through a computing environment 24, as in the second is example of FIG. 6, then the user 10 usually does not need to supply an external label. In this case, the internal computing environment identity label held by the computing environment is used to form the compartment_ID field. The user 10 ideally has been previously supplied with the internal label for the computing environment of interest, and compares the previously supplied internal identity label against the content of the compartment_ID field, to determine that the supplied integrity information corresponds to the expected computing environment. Alternatively, the user 10 has been previously supplied with an external label for the computing environment of interest. The computing environment passing the indirect integrity challenge provides the internal identity label, and the compartment_ID field is completed with the external label corresponding to that computing environment. The user 10 can then confirm that the external label provided in the compartment_ID field matches the expected computing environment.

Suitably, the compartment_ID in the externaldata field is added by the trusted device driver 221. In this case, the user 10 sends only the supplied_externaldata field (for example a nonce). After the trusted device driver 221 recognises the identity of the computing environment 24, the corresponding compartment_ID is placed in the hash function to make the externaldata field. The trusted device 213 signs the externaldata field as received from the trusted device driver 221, along with the corresponding integrity metrics for that computing environment, to form the signed integrity information.

The hash function forming the external data field is optionally extended to include other desired identity information concerning the computing environment 24. In one example the compartment_ID field comprises a process_ID for identifying the process 23, and a VM_ID for identifying the virtual machine application 26.

As a further refinement of this first preferred embodiment, the external label and the internal label can be employed in co-operation. Suitably, the integrity challenge issued by the user includes the external label. Suitably, the trusted device driver 221 matches the external label against the internal label of the computing environment passing the integrity challenge. If they match (i.e. both the internal label and the external label correspond to the same computing environment), then the trusted device driver 221 can be confident that the integrity challenge was received in the computing environment expected by the user 10, and will pass the challenge to the trusted device 213 for signing. Otherwise, the challenge is rejected, the user 10 will then not receive the expected integrity information, and knows that the challenge was not issued to the expected computing environment.

The first preferred embodiment of the present invention can also be used to pass a challenger_ID label, which identifies a computing environment receiving the user integrity challenge. This embodiment is particularly useful where, for example, the user issues an integrity challenge to a first computing environment, requesting integrity metrics about a second computing environment (the second computing environment being suitably identified by an internal or external label). In the response, the user 10 receives a challenger_ID label confirming the identity of the computing environment to which the challenge was issued, which is expected to correspond to the first computing environment; and receives a compartment_ID label identifying the computing environment relevant to the supplied integrity metric or group of integrity metrics, here expected to be the second computing environment. Hence, the user 10 is able to build up a more comprehensive picture of the computing environments running on the computing platform, and can identify and verify computing environments other than the computing environment to which the challenge is issued. In some circumstances the user 10 may only desire confirmation of the challenger_ID label, such that the compartment_ID label is not required and need not be supplied.

In a second preferred method for passing computing environment identity information, the trusted device 213 uses a different signature key for each computing environment. In step 701, the integrity metric or group of integrity metrics for a particular computing environment of interest are obtained, such as by using an internal label or supplied external label as mentioned above. Suitably, the trusted device driver 221 establishes a signature key pair associated with the selected computing environment, preferably a private signature key which corresponds to a public verification key. The private signature keys are each held by the trusted device 213, and the trusted device driver 221 identifies to the trusted device 213 which of the private signature keys should be used to sign the integrity metrics. Suitably, the trusted device 213 stores a plurality of private signature keys, each associated with one of the computing environments 24. In step 702, the integrity metrics are signed by the trusted device 213 with the private signature key unique to the selected computing environment 24. In step 704, the challenging user 10 uses the expected corresponding public verification key to verify the signed data. The verification will fail if the user does not receive signed integrity information concerning the expected computing environment.

As an option for either of the methods just discussed with reference to FIG. 7, in some circumstances it is desired to improved still further a user's confidence that the integrity metric or group of integrity metrics received in a response correspond to an expected computing environment. This aspect of the invention is particularly applicable to the situation where an indirect integrity challenge is issued to a computing environment 24. Preferably, the trusted device driver 221 enforces an authorisation policy, which restricts the type of integrity response which a computing environment is able to request. That is, when passing the indirect integrity challenge requesting integrity information about a particular computing environment, the trusted device driver 221 enforces an authorisation policy to confirm that the computing environment passing the challenge is authorised to access integrity information corresponding to the requested computing environment. As a specific example, a strict authorisation policy is enforced, such that each computing environment 24 can only successfully pass an integrity challenge requesting integrity information about that computing environment. The authorisation policy prevents the integrity challenge obtaining integrity information about any other computing environment. Therefore, when the user 10 successfully receives an integrity response, the user is confident that the received integrity information corresponds to the computing environment to which the challenge was issued.

The preferred methods of FIG. 7 are each particularly intended for use with a computing environment as discussed above with reference to FIGS. 1 to 5. However, the methods of FIG. 7 are applicable to any suitable form of computing environment.

In a further preferred aspect that can be applied to any of the methods described herein, the guest operating system 25 is itself a compartmented operating system. Multiple applications can be run on the guest operating system 25, each within a separate compartment of the guest operating system. This embodiment enables each computing environment 24 to be subdivided, and the methods described above are applied to the subdivided computing environments.

Advantageously, a trusted computing environment is provided by using a trusted device to verify that a guest operating system has booted in a trusted manner. By repeating this process and running multiple guest operating systems, multiple trusted computing environments are provided. A first application can run in a first of the computing environments, whilst a second application can run in a second of the computing environments, where the first and second applications are mutually incompatible or one does not trust the other. The preferred implementation using a virtual machine application in combination with a compartment allows each computing environment to be independently trusted.

It is very difficult for a process running in one computing environment to affect the integrity of any other computing environment. Advantageously, a user can verify the integrity of one computing environment without reference to the integrity of any other computing environment. In the preferred implementation each computing environment has an associated set of one or more integrity metrics which do not include or depend on information about any other computing environment.

Advantageously, a method has been described whereby an integrity response is provided allowing the user (challenger) to confirm that the integrity information corresponds to the expected computing environment. By combining this method with the other methods described above it is very difficult for a computing environment to be subverted and for incorrect integrity information to be supplied to the user.

The invention claimed is:

1. A method for verifying integrity of a computing environment, comprising the steps of:
   identifying a computing environment which it is desired to verify;
   obtaining an integrity metric associated with the identified computing environment;
   signing the integrity metric with a signature key, to form a signed integrity metric, the signed integrity metric including information identifying a computing environment; and
   transmitting the signed integrity metric to a challenger.

2. The method of claim 1, comprising receiving an integrity challenge from the challenger.

3. The method of claim 2, wherein the integrity challenge includes challenge information identifying a computing environment which it is desired to verify.

4. The method of claim 3, wherein the challenge information includes a computing environment identity label.

5. The method of claim 4, wherein the identity label is an external computing environment identity label.

6. The method of claim 5, comprising supplying an external computing environment identity label to a challenger, prior to the receiving step.

7. The method of claim 2, comprising passing the integrity challenge through a computing environment.

8. The method of claim 7, wherein the information identifying a computing environment comprises information identifying the challenging computing environment which passes the integrity challenge and/or information identifying a computing environment which it is desired to verify.

9. The method of claim 8, wherein the information comprises an identity label for identifying the challenging computing environment and/or an identity label for identifying the computing environment to verify.

10. The method of claim 9, wherein the or each identity label is an internal computing environment identity label.

11. The method of claim 10, comprising applying the internal computing environment identity label to the computing environment, prior to receiving the integrity challenge.

12. The method of claim 2, comprising checking that an identity label received in the integrity challenge corresponds to an identity label of a challenging computing environment passing the integrity challenge.

13. The method of claim 2, comprising confirming that a computing environment passing the integrity challenge has authorisation to request verification of a computing environment which it is desired to verify.

14. The method of claim 13, wherein the confirming step comprises restricting authorisation of a computing environment passing a challenge only to request verification of that computing environment.

15. The method of claim 13, wherein the confirming step comprises selectively restricting the computing environment passing the integrity challenge to request verification of another computing environment.

16. The method of claim 1, wherein the identifying step uses identity information supplied in an integrity challenge from a challenger and/or uses identity information about a computing environment which passes the integrity challenge.

17. The method of claim 16, wherein the identity information is an external computing environment label or an internal computing environment label.

18. The method of claim 1, comprising selecting one of a plurality of signature keys, the one signature key being associated with the identified computing environment.

19. The method of claim 18, wherein the signing step comprises signing the integrity metric with the selected signature key.

20. The method of claim 19, comprising supplying a verifying signature key to a challenger.

21. The method of claim 20, wherein the verifying signature key and the signing signature key form a complimentary public key and private key pair.

22. The method of claim 1, wherein the signing step includes forming the signed integrity metric with an external data field, the external data field including the information identifying a computing environment.

23. The method of claim 22, comprising receiving an integrity challenge from a challenger, the integrity challenge including external data; and forming a hash function of the received external data and the information identifying the computing environment, to form the external data field of the signed integrity metric.

24. The method of claim 22, wherein the information comprises a computing environment identity label of the computing environment associated with the integrity metric.

25. The method of claim 24, wherein the computing environment identity label is an internal computing environment identity label or an external computing environment identity label.

26. The method of claim 22, wherein the information includes a challenging identity label of a computing environment which passes an integrity challenge.

27. The method of claim 26, wherein the challenging identity label is an internal computing environment identity label or an external computing environment identity label.

28. The method of claim 22, wherein the information includes both a computing environment identity label identifying a computing environment associated with the integrity metric, and a challenging computing environment label identifying a computing environment which passes an integrity challenge.

29. The method of claim 22, wherein the information includes an identity of a virtual machine application running in the computing environment.

30. The method of claim 29, wherein the information includes an identity of a guest operating system provided by the virtual machine application.

31. The method of claim 30, wherein the information includes an identity of at least one process running on the guest operating system.

32. The method of claim 1, comprising verifying the signed integrity metric received by the challenger.

33. The method of claim 32, wherein the verifying step includes verifying the signature of the signed integrity metric.

34. The method of claim 33, wherein verifying the signature uses a verifying signature key.

35. The method of claim 34, wherein the verifying signature key and the signing signature key form a public key and private key pair.

36. The method of claim 32, wherein the verifying step includes verifying the information identifying a computing environment.

37. The method of claim 36, including verifying an identity of a computing environment associated with the integrity metric of the signed integrity metric.

38. The method of claim 36, including verifying an identity of a challenging computing environment which passes an integrity challenge.

39. The method of claim 36, wherein the verifying step uses an internal identity label and/or an external identity label associated with a computing environment.

40. The method of claim 32, including verifying the integrity metric of the signed integrity metric.

41. The method of claim 32, wherein the verifying step comprises comparing the signed integrity metric against expected values.

42. The method of claim 1, wherein the computing environment is one of a plurality of computing environments provided on a single host computing platform.

43. The method of claim 42, wherein the obtaining step comprises retrieving a stored integrity metric or group of integrity metrics associated with the identified computing environment.

44. The method of claim 42, wherein the integrity metric or group of integrity metrics comprise one or more integrity metric values each stored in a platform configuration register of a trusted device.

45. The method of claim 42, comprising forming an integrity metric or group of integrity metrics for the each computing environment, and storing the integrity metric or group of integrity metrics as one or more integrity metric values each in a platform configuration register of a trusted device.

46. A computing platform supporting at least one computing environment, the computing platform comprising:

a trusted device unit arranged to identify a computing environment which it is desired to verify, obtain an integrity metric associated with the identified computing environment, sign the integrity metric with a signature key to form a signed integrity metric, the signed integrity metric including information identifying a computing environment, and transmitting the signed integrity metric to a challenger.

47. The computing platform of claim 46, wherein the trusted device unit comprises a trusted device and a trusted device driver.

48. The computing platform of claim 47, wherein the trusted device driver is arranged to receive an integrity challenge from a challenger, identify a computing environment which it is desired to verify, and transmit the signed integrity metric to the challenger; and the trusted device is arranged to retrieve a stored integrity metric associated with the identified computing environment, and sign the integrity metric with the signature key.

49. The computing platform of claim 48, wherein the trusted device signs the integrity metric with a signature key associated with the identified computing environment.

50. The computing platform of claim 49, wherein the trusted device is arranged to store a plurality of signature keys, and is arranged to select one of the signature keys associated with the identified computing environment.

51. The computing platform of claim 48, wherein the trusted device is arranged to form the signed integrity metric including an external data field which includes the information identifying a computing environment.

52. The computing platform of claim 51, wherein the trusted device receives the integrity challenge including an external data from the challenger, and is arranged to form the external data field of the signed integrity metric using a hash function of the received external data and the information identifying a computing environment.

* * * * *